(12) United States Patent
Yang et al.

(10) Patent No.: US 9,500,345 B2
(45) Date of Patent: Nov. 22, 2016

(54) LIGHT SOURCE SYSTEM AND PROJECTION SYSTEM APPLIED THEREBY

(75) Inventors: Yi Yang, Shenzhen (CN); Yi Li, Pleasanton, CA (US)

(73) Assignee: APPOTRONICS (CHINA) CORPORATION, Shenzhen (CN)

( * ) Notice: Subject to any disclaimer, the term of this patent is extended or adjusted under 35 U.S.C. 154(b) by 233 days.

(21) Appl. No.: 14/346,300

(22) PCT Filed: Aug. 10, 2012

(86) PCT No.: PCT/CN2012/079913
§ 371 (c)(1),
(2), (4) Date: Sep. 18, 2014

(87) PCT Pub. No.: WO2013/040960
PCT Pub. Date: Mar. 28, 2013

(65) Prior Publication Data
US 2015/0022787 A1  Jan. 22, 2015

(30) Foreign Application Priority Data

Sep. 22, 2011  (CN) .......................... 2011 1 0284175

(51) Int. Cl.
*F21V 17/02* (2006.01)
*G03B 21/20* (2006.01)
(Continued)

(52) U.S. Cl.
CPC ................. *F21V 17/02* (2013.01); *F21V 9/16* (2013.01); *F21V 13/02* (2013.01); *F21V 13/08* (2013.01);
(Continued)

(58) Field of Classification Search
CPC .............. G03B 21/204; G03B 21/2033; H04N 9/3114; H04N 9/3161; H04N 9/3164
See application file for complete search history.

(56) References Cited

U.S. PATENT DOCUMENTS

| 7,547,114 B2 | 6/2009 | Li et al. |
| 2009/0034284 A1 | 2/2009 | Li et al. |

(Continued)

FOREIGN PATENT DOCUMENTS

| CN | 101581410 A | 11/2009 |
| CN | 101836160 A | 9/2010 |
| JP | 2011128521 A | 6/2011 |

OTHER PUBLICATIONS

International Search Report in the parent PCT application No. PCT/CN2012/079913, dated Nov. 22, 2012.
(Continued)

*Primary Examiner* — Sultan Chowdhury
(74) *Attorney, Agent, or Firm* — Chen Yoshimura LLP

(57) ABSTRACT

A light source system and a projection system employing the same. The light source system includes a light source emitting an excitation light, a moving device carrying a wavelength conversion material and an adjustment device. The excitation light irradiates on the wavelength conversion material. When the moving device is in a periodical moving state, the light spot position irradiated by the excitation light on the moving device moves following a first working track. The adjustment device is used for adjusting the light spot position irradiated by the adjusted excitation light on the moving device so that it moves following a second working track. The first working track is separated from the second working track. The system can reduce the working load of the wavelength conversion material on the first working track, thus slowing the aging of the wavelength conversion material, and improving the life of the light source system.

20 Claims, 12 Drawing Sheets

(51) Int. Cl.
    *F21V 9/16*     (2006.01)
    *F21V 13/02*     (2006.01)
    *F21V 13/08*     (2006.01)
    *G01J 1/04*     (2006.01)
    *G03B 21/16*     (2006.01)

(52) U.S. Cl.
    CPC .............. *G01J 1/0448* (2013.01); *G03B 21/16* (2013.01); *G03B 21/204* (2013.01); *G03B 21/2093* (2013.01)

(56) References Cited

U.S. PATENT DOCUMENTS

| | | | |
|---|---|---|---|
| 2009/0284148 A1 | 11/2009 | Iwanaga | |
| 2011/0116253 A1* | 5/2011 | Sugiyama | F21S 10/007 362/84 |
| 2012/0201030 A1* | 8/2012 | Yuan | G02B 26/008 362/293 |
| 2013/0301237 A1* | 11/2013 | Finsterbusch | G03B 21/204 362/84 |
| 2014/0140038 A1* | 5/2014 | Gerets | G03B 21/16 362/84 |
| 2014/0198301 A1* | 7/2014 | Yagyu | H04N 9/3158 353/31 |
| 2014/0211169 A1* | 7/2014 | Kitano | G03B 21/204 353/31 |

OTHER PUBLICATIONS

IPRP in the parent PCT application No. PCT/CN2012/079913, dated Mar. 25, 2014.

* cited by examiner

LIGHT SOURCE SYSTEM AND PROJECTION SYSTEM APPLIED THEREBY

BACKGROUND OF THE INVENTION

1. Field of the Invention

This invention relates to projector technology, and in particular, it relates to a light source system and projection systems employing the same.

2. Description of the Related Art

Conventional projector technology typically generate a multi-colored light for projection application by illuminating an excitation light on wavelength conversion materials of multiple wavelength ranges carried on a moving device. This type of devices can solve the problem of heat dissipation of the wavelength conversion material under high-powered excitation, because the illumination area of the excitation light on the wavelength conversion material is not a fixed point, but a ring shape. This increases the area of illumination and lowers the power intensity of the excitation, solving the problem of reduced light conversion efficiency of the wavelength conversion material due to high temperature.

While such a system can increase the heat dissipation ability of the wavelength conversion material to some degree, under prolonged use, the wavelength conversion material located within the ring shape will age, thereby limiting the life of the overall system.

SUMMARY OF THE INVENTION

An object of the present invention is to provide a light source system and a projection system employing the same, with a goal of increasing the life of the light source system.

The present invention provides a light source system, including a light source emitting an excitation and a moving device carrying wavelength conversion materials, the excitation light illuminating the wavelength conversion materials, wherein when the moving device is in a periodically moving state, the light spot of the excitation light on the moving device moves periodically along a first working track, the light source system further including an adjusting device for adjusting the position of the light spot, wherein the adjusted light spot of the excitation light on the moving device moves periodically along a second working track, wherein the first working track is separate from the second working track.

The present invention further provides a light source system, including a light source emitting an excitation and a moving device carrying wavelength conversion materials, the excitation light illuminating the wavelength conversion material on the moving device, wherein when the moving device moves relative to the excitation light in a first moving state, the light spot of the excitation light on the moving device moves periodically in a first direction, the light source system further including an adjusting device for continuously adjusting the position of the light spot back-and-forth in a second direction when the moving device is in the first moving state, where the second direction intersects the first direction, the adjusted light spot moves periodically along a working track in a third direction which is a composite of the first direction and the second direction, wherein compared to a light spot moving periodically along the first direction, within the same time interval, any unit area along the working track is illuminated by the excitation light for a shorter period of time.

The present invention further includes a projection system which includes the above described light source systems.

In a light source system according to the invention, by adjusting the position of the light spot with the adjusting device, the adjusted light spot of the excitation light on the moving device moves periodically along a second working track, and because the second working track is separate from a first working track of the unadjusted light spot, the load on the wavelength conversion materials along the first working track can be reduced, the aging of the wavelength conversion materials is slowed down, and the life of the light source device is increased. In another light source device of the present invention, within in the same time interval (such as the time interval it takes for the light spot to move one cycle in the third direction), because any unit area of the wavelength conversion materials along the working track in the third direction is illuminated for shorter period of time compared to conventional technology where the light spot moves along the first direction, the load on the unit area of wavelength conversion materials along the working track is reduces, the aging of the wavelength conversion materials is slowed down, and the life of the light source device is increased.

DETAILED DESCRIPTION OF THE PREFERRED EMBODIMENTS

The technical schemes of the present invention are described further below with reference to the drawings and the detailed embodiments. It should be understood that the following embodiments only serve to explain the invention but do not limit the invention.

Figure 1:
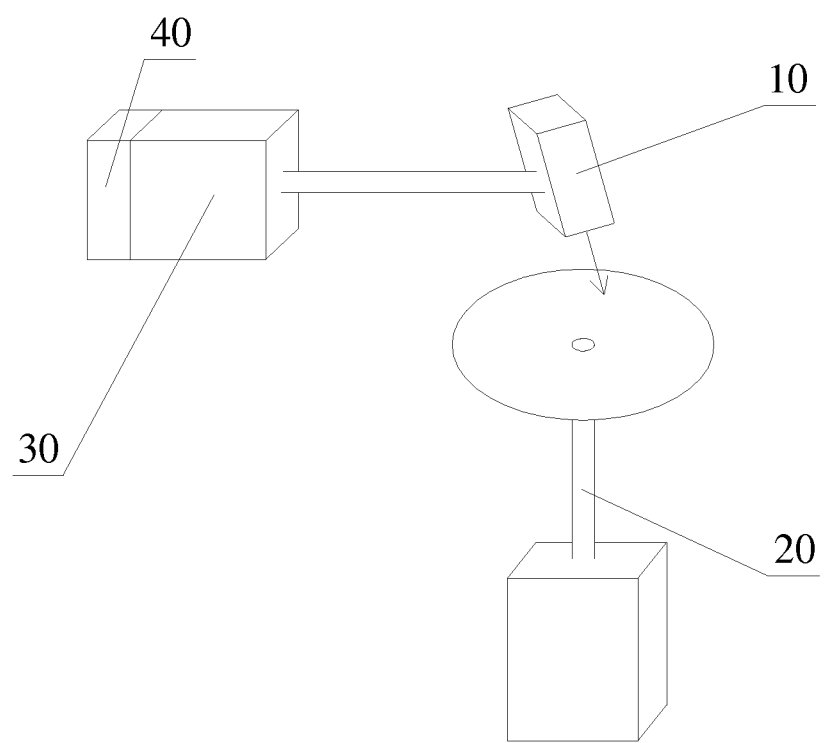
FIG. 1 illustrates the structure of a light source system according to a first embodiment of the present invention.

Refer to FIG. 1, which illustrates the structure of a light source system according to a first embodiment of the present invention.

In this embodiment, the light source system includes a light source 10 for emitting an excitation light, and a moving device 20 carrying light wavelength conversion materials layers. The excitation light from the light source 10 illuminates the wavelength conversion materials. When the moving device 20 is in a periodic moving state, the light spot of the excitation light on the moving device 20 moves periodically along a first working track. The light source system further includes an adjusting device 30, which is used to adjust the light spot position when the moving device stops moving. After the light spot position is adjusted by the adjusting device 30, the moving device 20 is triggered to resume its periodic movement, so that the adjusted light spot of the excitation light on the moving device 20 moves periodically along a second working track. The first and second working tracks are separate from each other.

Operators may from time to time manually stop the movement of the moving device 20. The moving device 20 is coupled to the adjusting device 30 (not shown in the drawing), so that after the movement of the moving device is stopped, the adjusting devices is triggered to adjust the light spot position. Preferably, the light source system further includes a control device 40, which is coupled to the adjusting device 30 and the moving device 20, to stop the movement of the moving device 20 at regular time intervals, then trigger the adjusting device 30 to adjust the light spot position, such that the adjusting device 30 adjusts the light spot position at regular time intervals. The regular time interval can be set by the operator based on the aging progress of the wavelength conversion materials.

In this embodiment, the adjusting device 30 is coupled to the light source 10, and the adjusting device 30 can move the moving device 20 laterally when the moving device 20 stops its periodic movement, causing the light spot to be displaced in a direction that intersects the first working track, so that the first and second working tracks are separated. For example, when the moving device 20 is a circular disk shape, and the first working track is a ring shape concentric with the moving device, the adjusting device 30 can drive the light source 10 to move laterally, so that the light spot is moved to different radial positions on the moving device 20, resulting in a second working track that is a ring concentric with but separated from the first working track. Preferably, when the moving device 20 is a circular disk shape, and the working track of the light spot is a circle concentric with the moving device, the adjusting device 30 adjusts the light spot in a radial direction of the moving device 20. It should be understood that the light spot can be adjusted in a non-radial direction, as long as the lateral movement causes the light spot to be displaced in a direction that intersects its working track, such that the first and second working tracks are separated to achieve the beneficial effect of the invention.

This embodiment may further includes a sliding rail (not shown in the drawing), and the light source 10 can be mounted on the sliding rail to restrict the motion of the light source 10, which enhances the stability of the lateral movement of the light source 10 and prevents shaking during its high speed movement. The sliding rail may be provided with an affixing member (not shown in the drawing) to mount the light source.

For the adjusting device 30 to adjust the light source 10 to accomplish the position adjustment of the light spot on the moving device 20, in addition to a linear lateral movement, the light source 10 can be rotated, as long as the light spot is displaced in a direction that intersects the first working track to achieve separation of the first and second working tracks. For example, the rotation may be a clockwise or counter-clockwise rotation around a transverse axis of the light source 10 (i.e. in the horizontal direction in the drawing), or a clockwise or counter-clockwise rotation around a side edge of the bottom face of the light source 10, or other rotation movements that can cause the light spot to be displaced to different radial positions of the moving device 20, which are not described in detail here.

This embodiment is described above using a circular shaped moving device 20 to explain the movement of the light source; moving devices of other shapes will be described below. If the moving device 20 is a linearly moving plate, when the moving device 20 is in a periodical moving state, the moving plate moves linearly back and forth relative to the light source 10, so that the first working track of the light spot of the light source 10 on the moving device 20 is a straight line. The adjusting device 30 is coupled to the light source 10, and adjusts the light source 10 to shift or rotate when the moving device 20 stops moving, causing the light spot to be displaced in a direction that intersects the first working track. For example, the light source 10 can be moved in a direction perpendicular to the above straight line, so that the second working track is a straight line parallel to the first working track.

Similarly, when the moving device 20 is a cylinder shaped moving plate, the moving device 20 rotates around its cylindrical axis relative to the light source 10, and the first working track of the light spot of the light source 10 on the moving device 20 is a ring on the side surface of the cylinder. The adjusting device is coupled to the light source 10, and causes the light source to shift or rotate when the moving device 20 stops moving, so that the light spot is displaced in a direction that intersects the first working track, and the first and second working tracks are separated. For example, the light source 10 can be moved in a direction perpendicular to the first working track, i.e. in a direction parallel to the rotational axis of the cylinder, so that the second working track is a ring on the side surface of the cylinder separated from the first working track.

The above embodiment can change the light spot position of the light source 10 on the moving device 20, separating the first and second working tracks, thereby solving the problem of aging of the wavelength conversion material caused by a fixed working track of the light spot and limited life of the moving device 20 that results from it.

Figure 2:
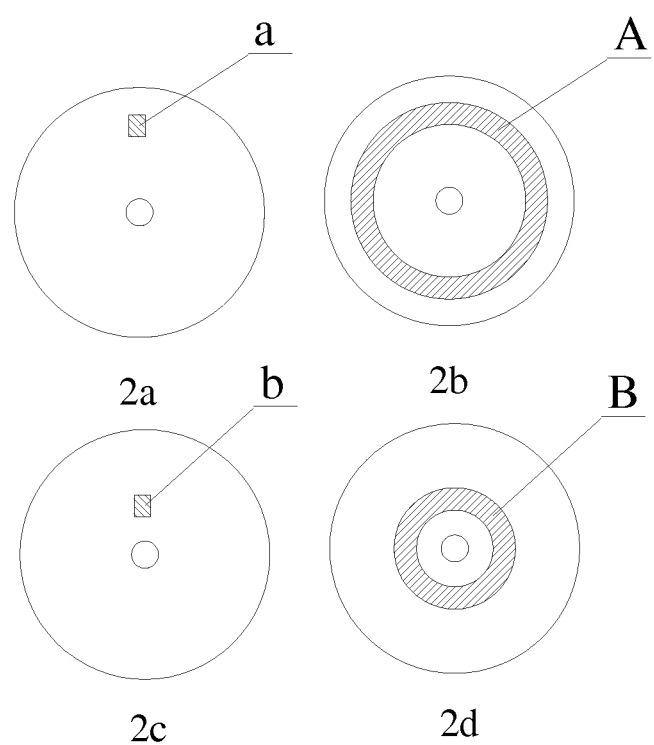
FIG. 2 illustrates the relative movement of the light spot on the moving device in the light source system according to the first embodiment of the present invention.

Refer to FIG. 2, which illustrates the relative motion of the light spot of the light source 10 on the moving device 20 in the light source system according to the first embodiment of the present invention.

In this embodiment, as shown in FIG. 2a, the moving device 20 has a circular disk shape, and the position of light spot of the light source on the moving device 20 is a. When the moving device 20 rotates periodically around its axis, the light spot of the excitation light on the moving device moves periodically along the first working track which is the ring A shown in FIG. 2b. Using the technical scheme of this embodiment, the adjusting device adjusts the light spot position when the moving device stops moving, e.g. by shifting or rotating the light source. As shown in FIG. 2c, the light spot position on the moving device 20 is changed to b, which has a smaller radial position than point a. Thus, when the moving device 20 resumes its periodic rotation, the light spot of the excitation light moves periodically along the second working track which is the ring B shown in FIG. 2d. This way, by shifting or rotating the light source, the light spot position of the excitation light on the moving device 20 is changed. As shown in FIG. 2, after adjusting the light spot position, the working track of the light spot of the excitation light on the moving device 20 changes from the larger ring A to the smaller ring B, achieving the separation of the first and second working tracks.

When adjusting the working track of the light spot, the periodic movement of the moving device 20 can be stopped, and then resumed after the light spot position is adjusted. Alternatively, the light spot position can be adjusted while the moving device 20 is moving periodically; however, during light spot position adjustment, the ring shape A cannot instantly change to the ring shape B, so a transition working track is formed when changing from ring A and ring B. The converted light generated by such a transition working track is unwanted for the projection system. Thus, a processing unit of the projection system can control various parts of the projection system such that the converted light generated by the transition working track during the light spot adjustment period is not projected onto the screen. In short, it is preferable for the adjusting device 30 to adjust the light spot position when the moving device 20 stops moving, but it is also possible to adjust the light spot position while the moving device 20 is moving. In the latter case, the control device 40 can trigger the adjusting device 30 to adjust the light spot position based on a predetermined schedule, and the moving device 20 does not have to be stopped.

By changing the light spot position of the excitation light of the light source 10 on the moving device 20, the wavelength conversion materials carried on the moving device 20 can be more effectively utilized, and the life of the light source system can be multiplied.

Figure 3:
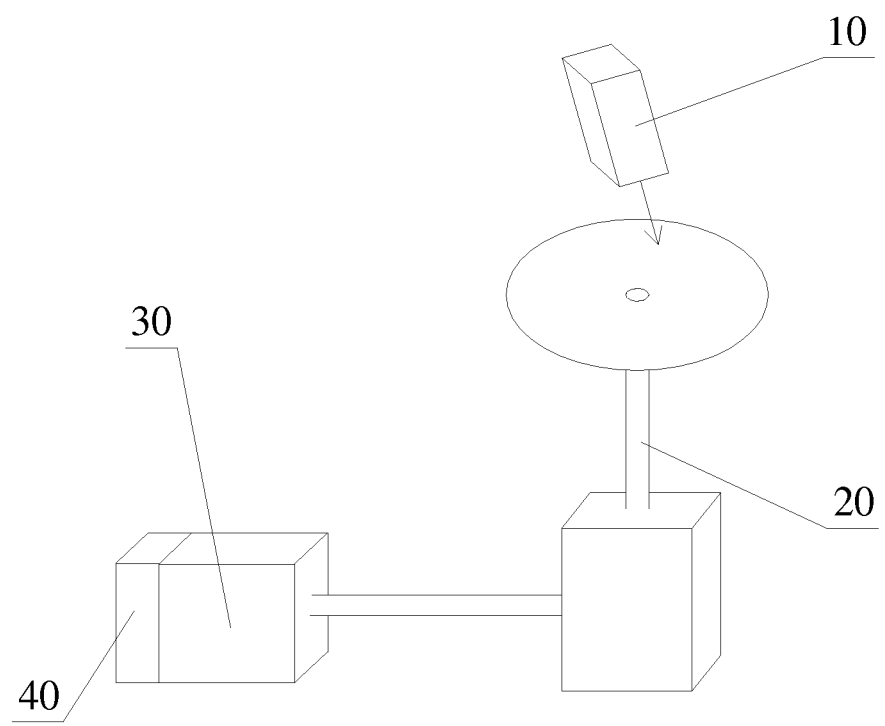
FIG. 3 illustrates the structure of a light source system according to a second embodiment of the present invention.

Refer to FIG. 3, which illustrates the structure of a light source system according to a second embodiment of the present invention.

This embodiment is similar to the first embodiment, a difference being the adjusting device 30 is coupled to the moving device 20, to drive the moving device 20 to shift or rotate, so as to cause the light spot position to be displaced in a direction that intersect the first working track.

Taking a circular disk shaped moving device 20 as an example, in this embodiment, the adjusting device 30 can drive the moving device 20 to shift when the latter stops its periodic movement, so as to change the radial position of the light spot on the moving device, and then trigger the moving device to resume the periodic movement. This achieves the separation of the first and second working tracks. As in the first embodiment, preferably, the adjusting device 30 adjusts the light spot to move in a radial direction of the moving device 20 by shifting the moving device. Even if the movement of the light spot is not strictly in the radial direction, the beneficial effect of the invention can be achieved as long as the light spot is shifted so that it is displaced in a direction that intersect the first working track, and that the radius of the circle swept by of the light source 10 on the moving device is changed.

As in the first embodiment, the way the adjusting device 30 adjusts the moving device to change the light spot of the excitation light on the moving device 20 can also include rotating the moving device, where the rotation causes a displacement of the light spot position in a direction that intersects the first working track. The rotation may be around a transverse axis of the moving device 20 (horizontal in the figure) and in a clockwise or counter-clockwise direction; it can be other rotation that can cause the light spot position to change in at least the radial direction of the moving device 20, so chat the first and the second working tracks are separated. As in the first embodiment, in this embodiment, the adjusting device can also control the moving device to shift or rotate in the above manner during its periodic movement, without having to stop the periodic movement of the moving device. The principle and technical scheme of this embodiment are similar to those of the first embodiment and will not be described in more detail here.

Figure 4:
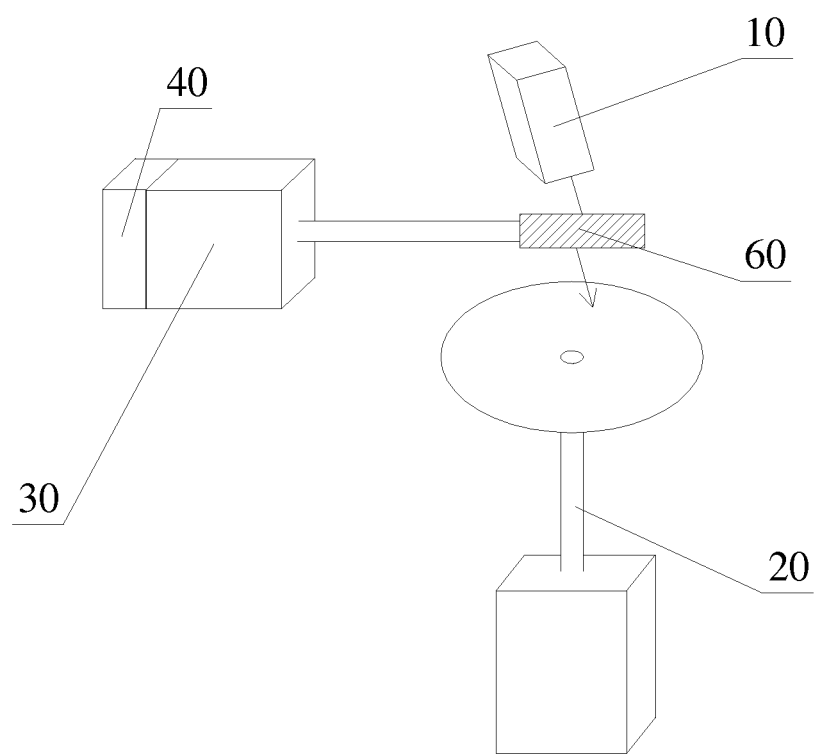
FIG. 4 illustrates the structure of a light source system according to a third embodiment of the present invention.

Refer to FIG. 4, which illustrates the structure of a light source system according to a third embodiment of the present invention.

This embodiment is similar to the first embodiment, a difference being the light source system further includes a prism 60 disposed in the optical path between the light source 10 and the moving device 20 for refracting the excitation light from the light source 10 to the moving device 20. The adjusting device 30 is coupled to the prism 60, to drive the latter to shift or rotate when the moving device stops its periodic movement, whereby the light path of the excitation light is changed. This causes the light spot position to be displaced in a direction that intersect the first working track, to achieve the separation of the first and second working tracks. Similarly, when the moving device is a circular disk and the first working track is a concentric circle of the disk, the adjusting device preferably drives the prism to shift or rotate, causing the light spot position to move in a radial direction of the disk.

As in the first embodiment, the way that the adjusting device 30 adjusts the prism 60 to change the light spot position on the moving device 20 can also include rotating the prism 60, so that the light spot position is displaced in a direction that intersects the first working track, to achieve the separation of the first and second working tracks. In this embodiment, the adjusting device can also control the prism to shift or rotate in the above manner during the periodic movement of the moving device, without having to stop the periodic movement. The principle and technical scheme of this embodiment are similar to those of the first embodiment and will not be described in more detail here.

Figure 5:
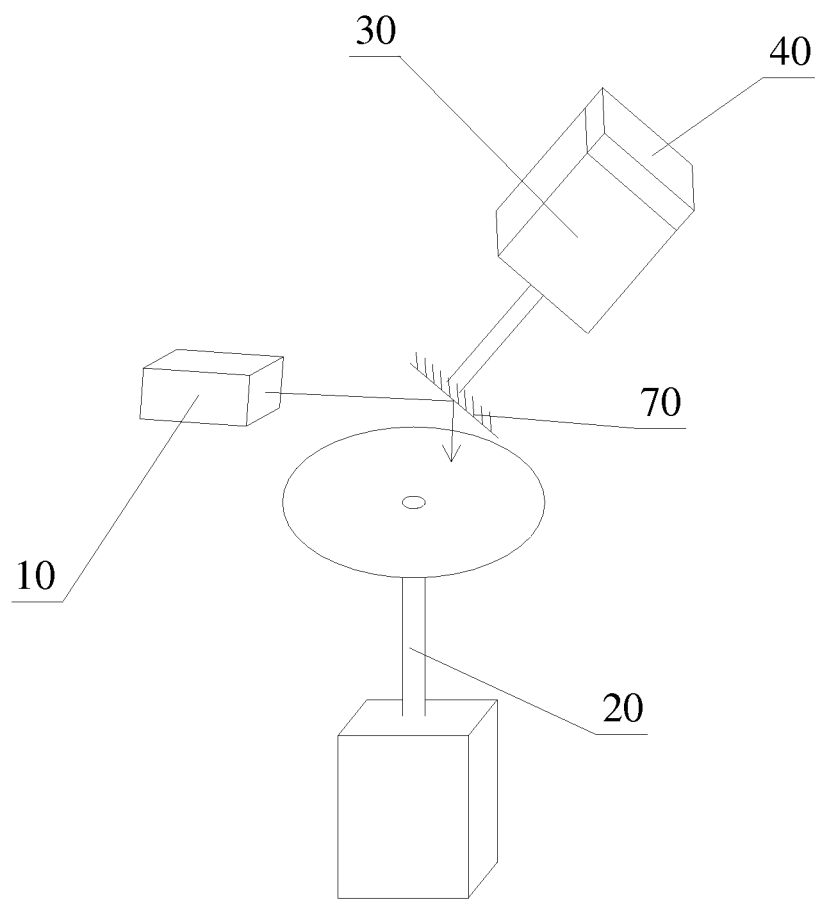
FIG. 5 illustrates the structure of a light source system according to a fourth embodiment of the present invention.

Refer to FIG. 5, which illustrates the structure of a light source system according to a fourth embodiment of the present invention.

This embodiment is similar to the third embodiment, a difference being the prism of the third embodiment is replaced by a reflecting device 70, for reflecting the excitation light from the light source 10 to the moving device 20. The adjusting device 30 is coupled to the reflecting device 70, to drive the latter to shift or rotate, i.e. to change the position where the light is reflected or the angel between the reflecting surface of the reflecting device 70 and the excitation light. This changes the light path of the excitation light, causing the light spot position to be displaced in a direction that intersects the first working track, to achieve the separation of the first and second working tracks. The principle and technical scheme of this embodiment are similar to those of the third embodiment and will not be described in more detail here.

Figure 6:
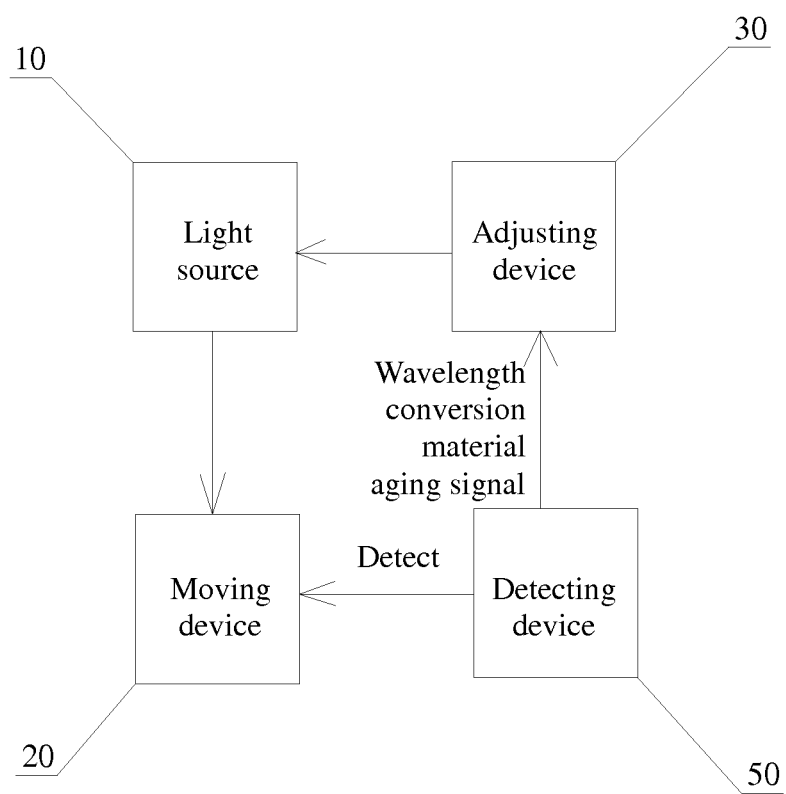
FIG. 6 is a block diagram illustrating a light source system according to a fifth embodiment of the present invention.

Refer to FIG. 6, which is a block diagram illustrating a light source system according to a firth embodiment of the present invention.

This embodiment is similar to the first embodiment, a difference being the light system further includes a detecting device 50, for detecting whether the wavelength conversion material on the periodically moving device 20 has aged. The detecting device 50 detects the emitted light intensity from the wavelength conversion materials on the moving device 20 and compares it to a predetermined value. When the emitted light intensity is below the predetermined value, the detecting device 50 sends a "aged material" signal to the adjusting device 30; this signal triggers the adjusting device 30 to adjust the light spot, such as to shift the light source 10 by a predetermined distance or rotate it by a predetermined angle, so as to separate the first and second working tracks. Further, when the detecting device detects that the converted light intensity is below a predetermined value, it can first controls the moving device to stop its periodic movement, and then triggers the adjusting device 30 to adjust the light spot position.

In this embodiment, the adjusting device 30 can also be coupled to the prism described in the third embodiment, or to the reflecting device 70 described in the fourth embodiment. Similarly, when the detecting device 50 detects that the light intensity is below the predetermined value, the detecting device 50 sends a "aged material" signal to the adjusting device 30, triggering the adjusting device 30 to shift or rotate the prism 60 or reflecting device 70, in order to change the light path of the excitation light so that the working tracks of the light spot before and after the adjust are separated.

Figure 7:
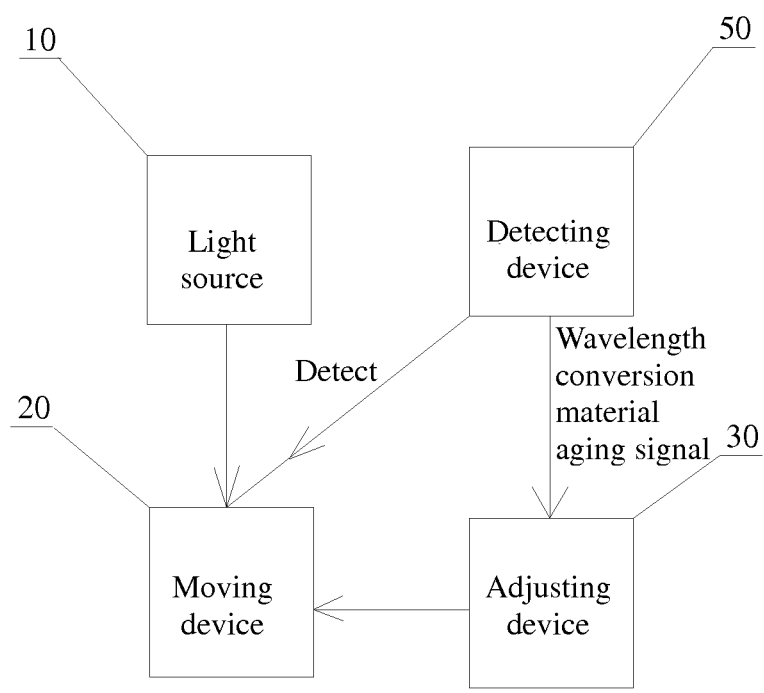
FIG. 7 is a block diagram illustrating a light source system according to a sixth embodiment of the present invention.

Refer to FIG. 7, which is a block diagram illustrating a light source system according to a sixth embodiment of the present invention.

This embodiment is similar to the fifth embodiment, a difference being that the adjusting device 30 is coupled to the moving device 20; when the detecting device 50 detects that the emission intensity of the wavelength conversion material is below the predetermined value, it controls the moving device to stop its periodic movement, and sends the "aged material" signal to the adjusting device 30. The adjusting device 30 then shifts or rotates the moving device 20 by a predetermined distance or angle to achieve the separation of the first and second working tracks.

In the above first to sixth embodiments, the adjusting device 30 preferably adjusts the light spot position in a direction perpendicular to the first working track. The moving device 20 is preferably a circular disk, the working track of the light spot is a circle concentric with the disk, and the adjusting device 30 adjusts the light spots preferably by shifting it along a radial direction of the moving device 20.

The present invention provides another light source system. Referring to FIG. 1, a seventh embodiment is similar to the first embodiment described above, a difference being, when the moving device 20 is in a first moving state with respect to the excitation light, the position of the excitation light spot on the moving device 20 moves in a first direction; the adjusting device 30 adjusts the light spot position continuously back and forth in a second direction that intersects the first direction while the moving device is in a first moving state. The adjusted light spot moves periodically along a working track in a third direction which is a composite of the first and second directions. Compared to the light spot that periodically moves in the first direction, any unit area on this working track is illuminated by the excitation light for a shorter amount of time within a given time period. In this embodiment, the control device 40 controls the adjusting device 30, which is in turn coupled to the light source 10. The adjusting device 30 is used to adjust the light spot position by moving the light source to continuously shift back and forth or to rotate when the moving device 20 is in the first moving state, so that the light spot continuously shift back and forth or rotate in the second direction. This shift or rotation causes the light spot position to be displaced in a direction that intersects with the first direction, so that the light spot position moves periodically along a working track in a third direction which is a composite of the first and second directions.

A main difference between the seventh embodiment and the first embodiment is: In the seventh embodiment, when the moving device is in a first moving state relative to the excitation light, the adjusting device periodically and continuously adjusts the light spot position back and forth in the second direction, so that the light spot position moves periodically along a working track in a third direction which is a composite of the first and second directions. The adjusting process occurs during the entire movement process of the moving device, i.e. the entire process when the effective converted light is output. While in the first embodiment, either the light spot adjustment is carried out after the moving device stops its periodical movement, to adjust the light spot to the target position (e.g. point b in FIG. 2*c*), and thereafter the adjustment process is stopped and the periodic movement of the moving device is resumed; or the light spot is adjusted to the target position (e.g. point b in FIG. 2*c*) while the moving device is periodically moving, and thereafter the adjustment process is stopped. In short, in the seventh embodiment the adjustment is continuous and accompanies the entire movement process of the moving device, while in the first embodiment, the adjustment process is momentary and stops as soon as the light spot is adjusted to the target position.

Compared to conventional technology where the light spot moves periodically along the first direction, in the seventh embodiment, within the same time period (e.g. within one cycle of the light spot movement along the third direction), any unit area on the working track along the third direction is illuminated by the excitation light for a shorter amount of time, therefore the work load of the wavelength conversion materials in any unit area of this working track is reduced. This slows the aging of the wavelength conversion material and increases the life of the light source system.

Figure 8:
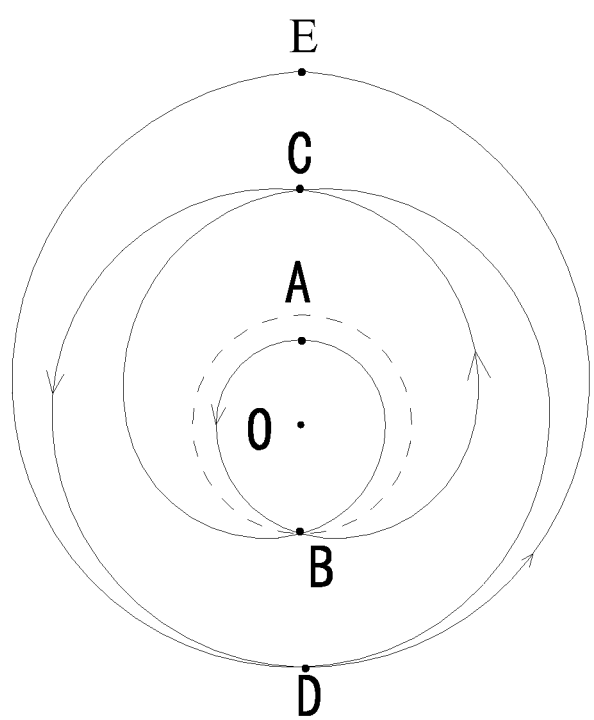
FIG. 8 illustrates a track of the light spot in a light source system according to an eighth embodiment of the present invention.

For better understanding, the principle of the seventh embodiment is described further below using a specific implementation. FIG. 8 illustrates a working track in a light source system according to an eighth embodiment of the present invention. As shown in FIG. 8, in the eighth embodiment, the moving device is a circular disk center at the point O. When the moving device is in a first moving state relative to the excitation light, the light spot of the excitation light on the moving device moves periodically in a first direction, which is shown in the figure as the dashed line in the angular direction of the disk. For example, the first moving state of the circular disk relative to the excitation light may be achieved by keeping the light source stationary and moving the disk in the first direction, i.e., along the angular direction of the disk shown as the dashed line in the figure, or by keeping the disk stationary and rotating the light spot of the excitation light source along the first direction.

When the disk is in the first moving state relative to the excitation light, the adjusting device can continuously adjust the light spot back and forth along the second direction, which is the radial direction of the disk, such that the adjusted light spot position periodically moves along a working track in a third direction which is a composite of the radial direction and the angular direction shown as the dashed line. The working track is shown as the solid line in FIG. 8, which is a spiral shape. Starting from the lowest point B of the dashed line (i.e. where the solid line intersects the dashed line), when the disk is in the first moving state relative to the excitation light and the adjusting device continuously adjusts the light spot position back and forth in the second direction, the light spot moves counter-clockwise from the starting point via points C, D, E, D, C, B and A sequentially, then returns to the starting point to complete one movement cycle.

In this embodiment, the adjusting device can cause the light source to continuously shift back and forth or rotate relative to the disk, so that the light position moves continuously back and forth along the radial direction of the disk. The period of the continuous back and forth radial movement of the light spot and the period of the rotation of the light spot along the first direction can have any ratio, which is preferably greater than or equal to 2. Specifically, in this embodiment, the period of the continuous back and forth radial movement of the light spot is 4 times the period of the rotation of the light spot along the first direction.

In this embodiment, the working track shown in solid line is left-right symmetrical; the shortest distance from the solid line segment between point B and point A to point O is greater than ¼ of the radius of the dashed line circle. Assuming the period of the light spot movement along the dashed ling is 1 second (s), and in every is a unit area along the dashed line is illuminated by the excitation light for 0.1 s. The period of the light movement spot along the solid line is 4 s; because the closest point form the solid line to the point O is greater than ¼ of the radius of the dashed line circle, in every 1 s a unit area along the solid line is illuminated by the excitation light for less than 0.1 s, i.e. shorter than the illumination time of the unit area on the dashed line. Thus, the work load of the wavelength conversion materials in any unit area along the working track of this embodiment is reduced. As a result, the aging of the wavelength conversion materials is slowed down and the life of the light source system is increased.

Figure 9:
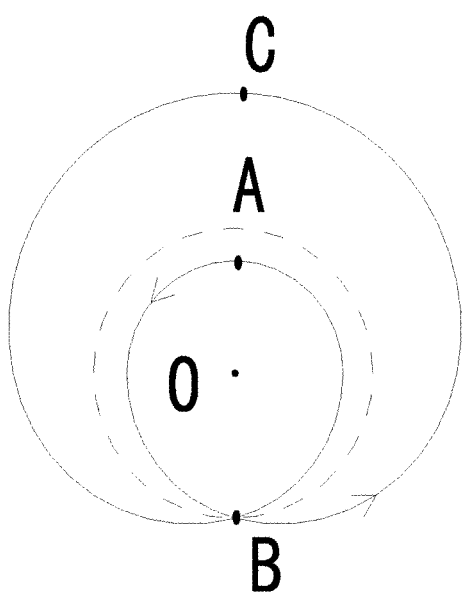
FIG. 9 illustrates another track of the light spot in a light source system according to a ninth embodiment of the present invention.

Refer to FIG. 9, which illustrates a light spot working track in a light source system according to a ninth embodiment of the present invention. As shown in FIG. 9, a difference between this embodiment and the embodiment of FIG. 8 is that, the period of the continuous back and forth radial movement of the light spot is 2 times the period of the rotation of the light spot along the first direction. The first direction is shown as the dashed line, and the working track of the periodic movement of the light spot along the third direction is shown as the solid line. Starting from point B, the light sport moves counter-clockwise via points C, B and A sequentially, then returns to point B to complete one cycle. In this embodiment, the closest distance between the solid line and the point O is greater than ½ of the radius of the dashed line circle. This ensures that within the same time interval, any unit area on the solid line is illuminated by the excitation light for a shorter time than any unit area on the dashed line. Thus, the work load of the wavelength conversion materials in any unit area along the working track of this embodiment is reduced. As a result, the aging of the wavelength conversion materials is slowed down and the useful life of the light source system is increased.

In the embodiments of FIG. 8 and FIG. 9, the second direction is the radial direction of the disk. It should be understood that the second direction can also be other directions that intersects the angular direction of the disk.

It should be understood that, as in the second embodiment, in the eighth and ninth embodiment, the adjusting device can be coupled to the moving device, for adjusting the moving device to continuously shift back and forth or rotate when the moving device is in the first moving state, so that the light spot continuously moves back and forth in the second direction. Or, as in the third and fourth embodiments, in the eighth and ninth embodiment, the light source system can include an optical component disposed along the light path of the excitation light between the light source device and the moving device, where the adjusting device is coupled to the optical component for causing the optical component to continuously shift back and forth or rotate while the moving device is in the first moving state, so that the light spot moves continuously back and forth in the second direction. The optical component may include a prism or a reflecting mirror. Preferably, the adjusting device causes the period of the continuous back and forth shift or rotation of the light source, the moving device or the optical component, i.e., the period of the continuous back and forth shift of the light spot on the moving device in the second direction, to be greater than or equal to twice the period of the light spot movement in the first direction.

Figure 10:
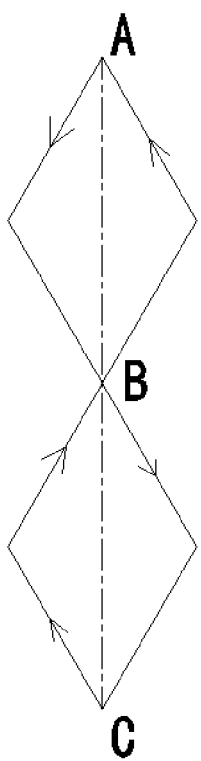
FIG. 10 illustrates another track of the light spot in a light source system according to a tenth embodiment of the present invention.

The embodiments of FIG. 8 and FIG. 9 use a circular disk as an example to illustrate the principle of the seventh embodiment; in the examples below, a rectangular plate is used. Refer to FIG. 10, which illustrates a light spot working track in a light source system according to a tenth embodiment of the present invention. As shown in FIG. 10, when the moving device (a rectangular strip shaped plate) is in a first moving state relative to the excitation light, the excitation light spot position on the moving device moves back and forth periodically along the longitudinal direction indicated by the dashed line, i.e., the first direction is the longitudinal direction of the plate. For example, the way to achieve a first moving state of the rectangular plate relative to the excitation light may be to keep the excitation light stationary while moving the rectangular plate back and forth along the first direction, i.e. the direction shown by the dashed line; or it can be achieved by keeping the rectangular plate stationary while moving the light spot of the light source back and forth along the first direction.

When the rectangular plate is in the first moving state relative to the excitation light, the adjusting device can periodically and continuously adjust the light spot position back and forth in the second direction, the second direction being perpendicular to the longitudinal direction shown by the dashed line, so that the adjusted light spot position moves periodically in a working track along a third direction which is a composite of the longitudinal direction shown by the dashed line and the second direction. This working track is shown by the solid line in FIG. 10, formed by two connected diamond shapes. Starting from point A, when the rectangular plate is in the first moving state relative to the excitation light and the adjusting device continuously adjusts the light spot position back and forth in the second direction, the light spot moves from the starting point, via points B, C, B sequentially, then returns to the starting point to complete one movement cycle.

In this embodiment, the adjusting device can continuously shift the light source back and forth or rotate it relative to the rectangular plate, such that the light spot shifts back and forth continuously in the second direction, i.e. the direction of the rectangular plate that is perpendicular to the longitudinal direction shown by the dashed line. The period of the continuous back and forth shift of the light spot in the second direction and the period of the continuous back and forth shift of the light spot along the first direction can have any ratio. Specifically, in this embodiment, the light spot is adjusted such that the period of the continuous back and forth shift of the light spot in the second direction is ½ of the period of the continuous back and forth shift of the light spot along the first direction.

In conventional technology, the light spot shifts back and forth along the longitudinal direction shown by the dashed line. Assuming that the period of the back and forth shift is 1 s, then any unit area along the dashed line is illuminated by the excitation light twice every 1 s. In the present embodiment, any unit area along the working track is illuminated by the excitation light once every 1 s. Moreover, because the zigzag line A-B-C is longer than the straight line A-B-C, a unit area on the working track is illuminated by the excitation light for a shorter period each time. Therefore, compared to the conventional technology, in the present embodiment a unit area along the working track is illuminated by the excitation light for a shorter amount of time every 1 s, so that the work load on the wavelength conversion materials along the working track is reduced. Therefore the aging of the wavelength conversion materials is slowed down, and the life of the light source device is increased.

Figure 11:
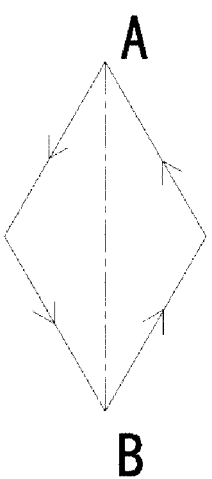
FIG. 11 illustrates another track of the light spot in a light source system according to a eleventh embodiment of the present invention.

Refer to FIG. 11, which illustrates the working track of the light spot in a light source system according to an eleventh embodiment of the present invention. As shown in FIG. 11, a difference between this embodiment and the embodiment of FIG. 10 is that, the period of the continuous back and forth shift of the light spot in the second direction is one time the period of the back and forth movement of the light spot along the first direction. The first direction is shown as the dashed line, and the light spot moves periodically in a working track along a third direction shown as the solid line. Starting from point B, the light spot moves counter-clockwise via point A then returns to point B to complete one movement cycle.

Figure 12:
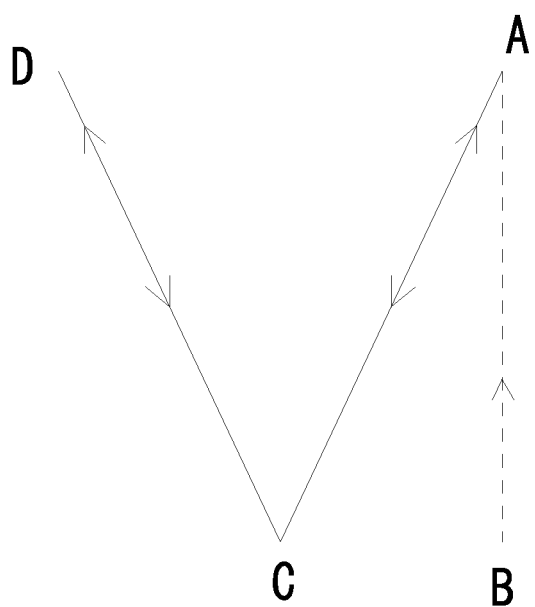
FIG. 12 illustrates another track of the light spot in a light source system according to a twelfth embodiment of the present invention.

Refer to FIG. 12, which illustrates the working track of the light spot in a light source system according to a twelfth embodiment of the present invention. As shown in FIG. 12, a difference between this embodiment and the embodiment of FIG. 11 is that, the period of the continuous back and forth shift of the light spot in the second direction is twice the period of the back and forth movement of the light spot along the first direction. The first direction is shown as the dashed line (A-B), and the light spot moves periodically in a working track along a third direction shown as the solid line. Starting from point A, the light spot passes through points C, D and C, then returns to point A to complete one movement cycle.

In the embodiments of FIGS. 10, 11 and 12, the second direction is the direction on the strip shaped plate perpendicular to the longitudinal direction shown as the dashed line. It should be understood that the second direction can be other directions on the strip shaped plate that intersect the longitudinal direction shown as the dashed line.

It should be understood that, as in the second embodiment, the adjusting device in the tenth, eleventh and twelfth embodiments can be coupled to the moving device, for adjusting the continuous back and forth shift or rotation of the moving device when the latter is in the first moving state, so that the light spot position shifts continuously back and forth along the second direction. Or, as in the third and fourth embodiments, the light system in the tenth, eleventh and twelfth embodiments can further include an optical component disposed on the excitation light path from the light source to the moving device, where the adjusting device is coupled to the optical component, for causing the optical component to continuously shift back and forth or rotate when the moving device is in the first moving state, so that the light spot position shifts continuously back and forth in the second direction. The optical component may include a prism or a reflecting mirror.

Embodiments of the present invention further provide a projection system, which includes the light source system of the above embodiments and achieves the function of the light source system of the above embodiments.

The preferred embodiments of the present invention are described above; they do not limit the scope of the invention. Any equivalent variations based on the instant disclosure and drawings, and their direct or indirect application in other related technology areas, are within the scope of patent protection of this invention.

What is claimed is:

1. A light source system, comprising:
a light source emitting an excitation light;
a moving device carrying wavelength conversion materials, the excitation light illuminating the wavelength conversion materials; and
an adjusting device for adjusting a position of a light spot of the excitation light formed on the wavelength conversion materials to at least a first position and a second position,
wherein when the position of the light spot of the excitation light is adjusted to the first position and the moving device is in a periodic moving state, the light spot moves relative to the wavelength conversion materials periodically along a first working track on the wavelength conversion materials, and when the position of the light spot of the excitation light is adjusted to the second position and the moving device is in a periodic moving state, the light spot moves relative to the wavelength conversion materials periodically along a second working track on the wavelength conversion materials, wherein the first working track is separate from the second working track.

2. The light source system of claim 1, wherein the adjusting device adjusts the light spot position when the moving device stops its periodic movement, and then triggers the moving device to resume its periodic movement after the adjustment.

3. The light source system of claim 1, further comprising a control device for triggering the adjusting device to adjust the light spot position at regular time intervals.

4. The light source system of claim 1, further including a detection system for detecting a light emission intensity from the wavelength conversion materials, and when the light emission intensity is below a predetermined value, sending a signal indicating aged materials to trigger the adjusting device to adjust the light spot position.

5. The light source system of claim 1, wherein the adjusting device is coupled to the light source for causing the light source to shift or rotate so that the light spot position is displaced in a direction that intersects the first working track.

6. The light source system of claim 1, wherein the adjusting device is coupled to the moving device for causing the moving device to shift or rotate so that the light spot position is displaced in a direction that intersects the first working track.

7. The light source system of claim 1, further comprising an optical component disposed along a light path of the excitation light between the light source device and the moving device, wherein the adjusting device is coupled to the optical component for causing the optical component to shift or rotate so that the light spot is displaced in the a direction that intersects the first working track.

8. The light source system of claim 7, wherein the optical component includes a prism or a reflecting mirror.

9. The light source system of claim 1, wherein the adjusting device adjusts the light spot position so that it is displaced in a direction perpendicular to the first working track.

10. The light source system of claim 9, wherein the moving device is a circular disk, and the first working track is a ring shape concentric with the moving device, and the adjusting device adjusts light spot to be displaced along to radial direction of the moving device.

11. A light source system, comprising a light source emitting an excitation light and a moving device carrying wavelength conversion materials, the excitation light illuminating the wavelength conversion materials, wherein when the moving device is in a first moving state, a light spot of the excitation light on the moving device moves periodically along a first direction, wherein the light source system further includes an adjusting device for continuously adjusting a position of the light spot back and forth along a second direction, the second direction intersects the first direction, wherein the adjusted light spot position moves periodically along a working track in a third direction that is a composite of the first and second directions, and wherein compared to the light spot that periodically moves in the first direction, any unit area on the working track is illuminated by the excitation light for a shorter amount of time within a given time period.

12. The light source system of claim 11, wherein the adjusting device is coupled to the light source for adjusting the light source to continuously shift back and forth or rotate when the moving device is in the first moving state, so that the light spot position shifts continuously along the second direction.

13. The light source system of claim 11, wherein the adjusting device is coupled to the moving device for adjusting the moving device to continuously shift back and forth or rotate when the moving device is in the first moving state, so that the light spot position shifts continuously along the second direction.

14. The light source system of claim 11, further comprising an optical component disposed along a light path of the excitation light between the light source device and the moving device, wherein the adjusting device is coupled to the optical component for causing the optical component to continuously shift back and forth or rotate when the moving device is in the first moving state, so that the light spot is displaced in the second direction.

15. The light source system of claim 14, wherein the optical component includes a prism or a reflecting mirror.

16. The light source system of claim 12, wherein a period of the continuous back and forth shift or rotation is greater than or equal to twice a period of the light spot movement in the first direction.

17. The light source system of claim 11, wherein then first direction is perpendicular to the second direction.

18. The light source system of claim 17, wherein the moving device is a circular disk shape, wherein the first direction is an angular direction of the moving device and the second direction is a radial direction of the moving device.

19. A projection system comprising the light source system of claim 1.

20. A projection system comprising the light source system of claim 11.

* * * * *